United States Patent [19]

Dawson

[11] 4,130,025
[45] Dec. 19, 1978

[54] CONTROL LINKAGE FOR CONVERTING ALTERNATING ROTARY MOTION INTO UNIDIRECTIONAL MOTION

[75] Inventor: Dennis E. Dawson, Highland Heights, Ohio

[73] Assignee: Caterpillar Tractor Co., Peoria, Ill.

[21] Appl. No.: 855,037

[22] Filed: Nov. 25, 1977

[51] Int. Cl.² .................. F16H 25/08; B60K 26/04
[52] U.S. Cl. ............................ 74/53; 74/878; 74/20; 74/48
[58] Field of Search .............. 74/43, 48, 58, 102, 74/877, 878, 45, 46, 20

[56] References Cited

U.S. PATENT DOCUMENTS

| | | | |
|---|---|---|---|
| 562,086 | 6/1896 | Livingstone | 74/48 |
| 3,392,605 | 6/1968 | McLean | 74/878 |
| 4,064,769 | 12/1977 | Amdall | 74/878 |

*Primary Examiner*—Samuel Scott
*Assistant Examiner*—Gerald A. Anderson
*Attorney, Agent, or Firm*—Phillips, Moore, Weissenberger, Lempio & Majestic

[57] ABSTRACT

A linkage assembly coupled between a pedal, rotatable from a neutral position in either of two directions, and a transmission and a carburetor or fuel injector. The linkage assembly includes a crank rotatable in either of two directions in response to the rotation of the pedal from the neutral position and a pair of arcuate links connected between the crank and a control rod which moves in a single direction in response to movement of the crank in either direction, the carburetor increasing the speed of a vehicle engine as the rod moves in the single direction. The assembly also includes other linkage which controls the transmission to shift the vehicle either into forward or reverse drive, depending on the direction of movement of the pedal from the neutral position, at various drive ratios.

22 Claims, 6 Drawing Figures

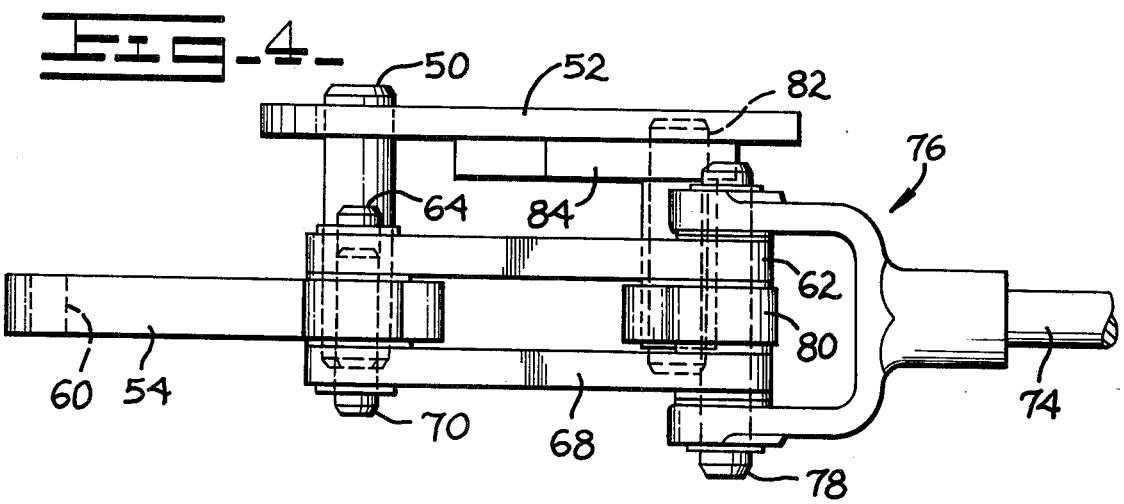
FIG-4-
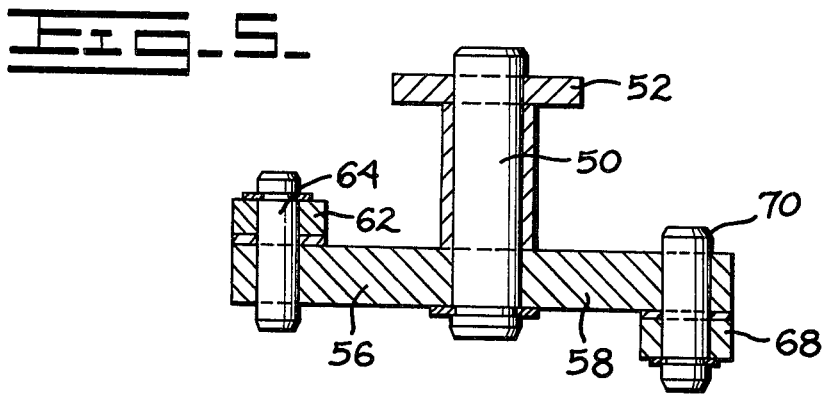
FIG-5-
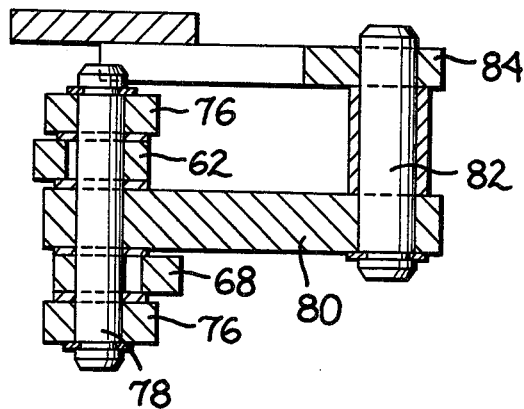
FIG-6-

CONTROL LINKAGE FOR CONVERTING ALTERNATING ROTARY MOTION INTO UNIDIRECTIONAL MOTION

BACKGROUND OF THE INVENTION

The present invention relates to motion transmitting devices and, more particularly, to a device for converting bidirectional input motion to single directional output motion. The present invention pertains even more specifically to a linkage assembly for controlling, from a single control member, the engine speed of a vehicle, and the vehicle speed and direction.

Many vehicles, including industrial lift trucks and loaders, are often equipped with a hydrostatic transmission or a torque converter transmission which controls vehicle speed and direction. The transmission provides for infinite variation of the drive ratio between the engine and the drive wheels in both the forward and reverse directions. The drive ratio and the drive direction are controllable by selectively moving a control member away from a central or neutral position. Motion of the control member in one direction from the neutral position progressively increases the drive ratio in the forward drive mode while motion of the control member in the opposite direction from the neutral position progressively increases the drive ratio in the reverse drive mode.

Such vehicles also include an engine speed control device including, for example, a carburetor or a fuel injector, which is controlled to increase engine speed as the drive ratio increases in either the forward or reverse directions. The engine speed control device is itself controlled by a control member, such as an accelerator pedal, which is movable away from a neutral position to increase engine speed.

In some industrial trucks or loaders, the vehicle speed and directional control function on the one hand, and the engine speed control function on the other hand, are accomplished by the same movement of an operator's single control member. A linkage assembly connects, for example, the hydrostatic transmission and carburetor to the single control member to control such a transmission and carburetor. The linkage is capable of shifting a swash plate in the transmission in either of two directions for forward and reverse drive, respectively, in accordance with the corresponding movement of the single control member from the neutral position. Concurrently, the linkage assembly shifts a throttle valve in the carburetor a proportionate amount but always in the same direction regardless of the direction of movement of the control member from the neutral position. The linkage also enables continued movement of the throttle valve in a single direction after the swash plate has reached the limit of travel in either direction. Thus, on movement of the control member in one direction from a neutral position, the linkage assembly causes the transmission to place the vehicle in forward drive at various drive ratios while increasing engine speed. On movement of the control member in the other direction from the neutral position, the linkage assembly causes the transmission to place the vehicle in reverse drive at various drive ratios while also increasing engine speed.

A number of different linkage assemblies have heretofore been used for interconnecting a single operator's control member with both a hydrostatic transmission and a carburetor or fuel injector to perform the above-described functions. However, such assemblies have the disadvantages of being complex and costly. Also, these assemblies are non-compact and, therefore, require more physical space than is desirable.

SUMMARY OF THE INVENTION

The present invention is directed to overcoming one or more of the problems as set forth above.

According to the present invention, these problems are overcome by a linkage used particularly for converting the bidirectional movement of the single control member into single directional movement of an output member to operate, for example, a carburetor. This linkage includes a crank pivotally connected to a support, a first arcuate link having a first arcuate slot and connected to one end of the crank, a second arcuate link having a second arcuate slot and connected to the opposite end of the crank, a third link or rod movable in the single direction, a pin for connecting in common the first link, the second link, and the third link, and a means, connected to the single control member, for rotating the crank. When the single control member is moved in one direction from a neutral position, the crank is moved in one direction to move the third link also in one direction. When the control member is moved in the other direction from the neutral position, the crank is rotated in another direction to move the third link in its one direction.

BRIEF DESCRIPTION OF THE DRAWINGS

FIG. 4 is a top view of the linkage of FIG. 2.

FIG. 5 is a cross-sectional view taken through lines 5—5 of FIG. 2.

FIG. 6 is a cross-sectional view taken along lines 6—6 of FIG. 2.

DETAILED DESCRIPTION OF THE DRAWINGS

Figure 1:
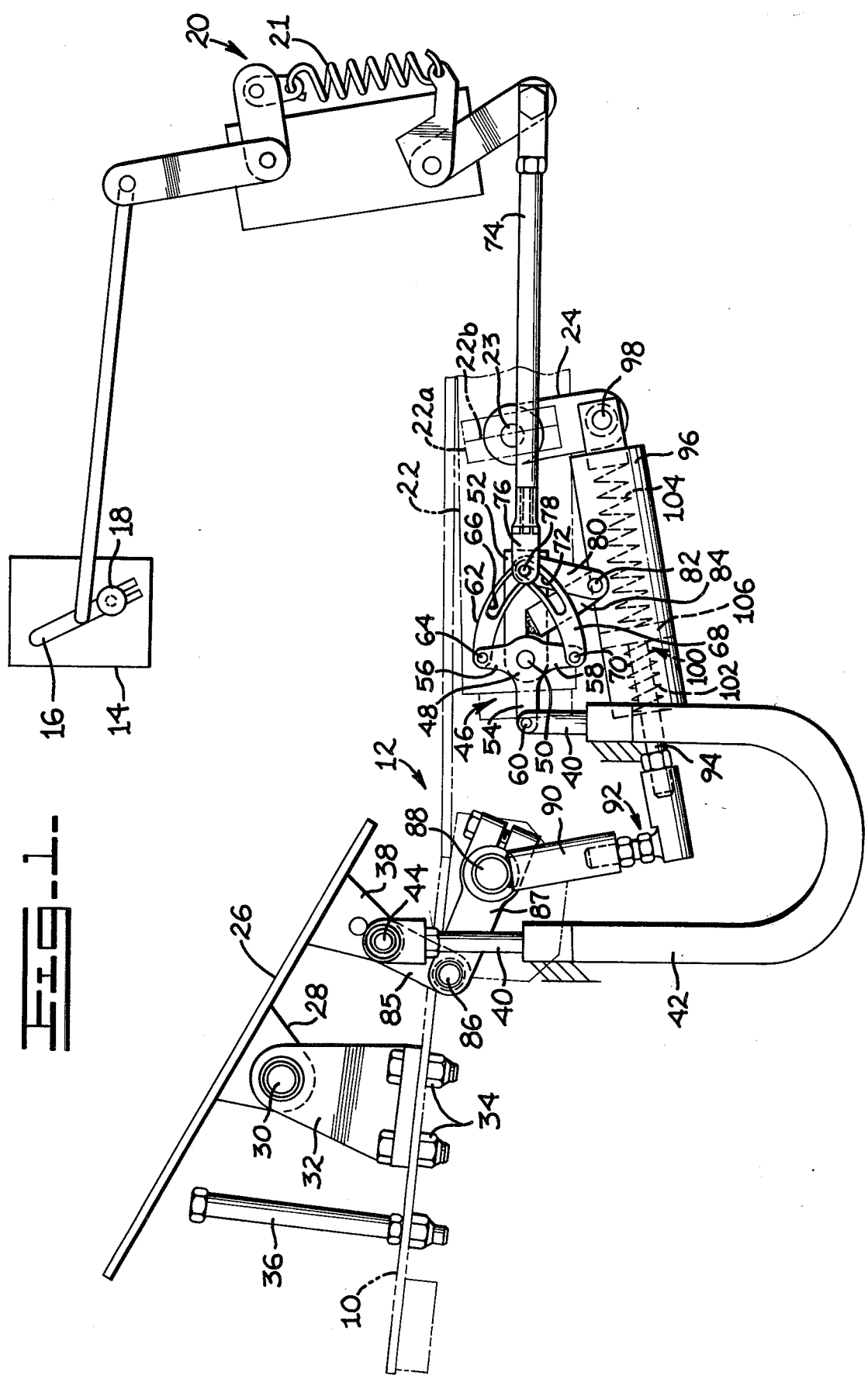
FIG. 1 is a side elevational view of the control linkage assembly of the present invention shown in a neutral position.

With reference to FIG. 1, there is shown in broken lines a frame 10 of a vehicle, supporting the operator's control linkage assembly 12 of the present invention. The vehicle has a prime mover or engine (not shown) whose speed is controlled by a carburetor 14 having a controlled member or throttle valve 16 pivotally mounted on a rod 18, though member 14 also could be a fuel injector. A governor, shown generally at 20, is linked to the throttle valve 16 to control the position of the valve and thereby control fuel flow to the engine to vary the engine speed.

The vehicle also includes a hydrostatic transmission shown partly broken away at 22, which may be of any well known construction, though transmission 22 also could be a torque converter transmission. The transmission 22 includes a variable displacement fluid pump 22a having a swash plate 22b which is connected to a rotatable shaft 23 extending through transmission 22. A movable control link 24 is connected to shaft 23 to rotate the latter and thereby vary the displacement of the pump, thus changing the effective drive ratio through the transmission 22. The link 24 is depicted in FIG. 1 in the neutral position which corresponds to zero displacement of the pump. The swash plate 22b may be pivoted away from such neutral position in one direction by link 24, to establish forward drive at a drive ratio determined by the degree of displacement of the swash plate. Similarly, movement of the link 24 in the opposite direction from the neutral position establishes reverse drive at a ratio which progressively increases in response to continued pivoting of the swash plate by this link. Suitable detailed constructions of the carburetor 14, governor 20 and transmission 22 are known to the art and, accordingly, will not be further described.

Control of the vehicle speed and direction, and the engine speed, the dependent on operator initiated movements of the linkage assembly 12. This assembly includes a single control member or rocker pedal 26 which has a depending bracket 28 that is pivotally mounted at 30 to a support or bracket 32 bolted to the frame 10 of the vehicle by bolts 34. Thus, rocker pedal 26 is pivotal about pivot 30 in both a counterclockwise and clockwise direction from the neutral position shown. The counterclockwise movement of the rocker pedal 26 is limited by a stop member 36 which constitutes a bolt fixed to and extending from the frame 10 of the vehicle.

A bracket 38 depends from one end of the rocker pedal 26 and a push-pull cable 40, protected by a sheath 42, has one end pivotally connected to the bracket 38 at pivot 44. A rotatable crank 46, shown enlarged in FIG. 2, has a hub 48 pivotally connected by a pin 50 to a support 52 which is fixed to transmission 22 such as by a weld. Crank 46 has three arms 54, 56 and 58 radially extending from the hub 48. The outer end of arm 54 is pivotally connected at 60 to the other end of cable 40 so that the crank 46 can be rotated about pin 50.

A first arcuate shaped link 62 is pivotally connected at one end to the outer end of arm 56 by a pivot 64. Arcuate line 62 has an arcuate shaped slot 66 extending approximately from the middle to the other end of the link 62. Another arcuate shaped link 68 has one end pivotally connected to the outer end of arm 58 by a pivot 70. Arcuate link 68 also has an arcuate shaped slot 72 extending approximately from the middle to the other end of this link 68.

Figure 2:
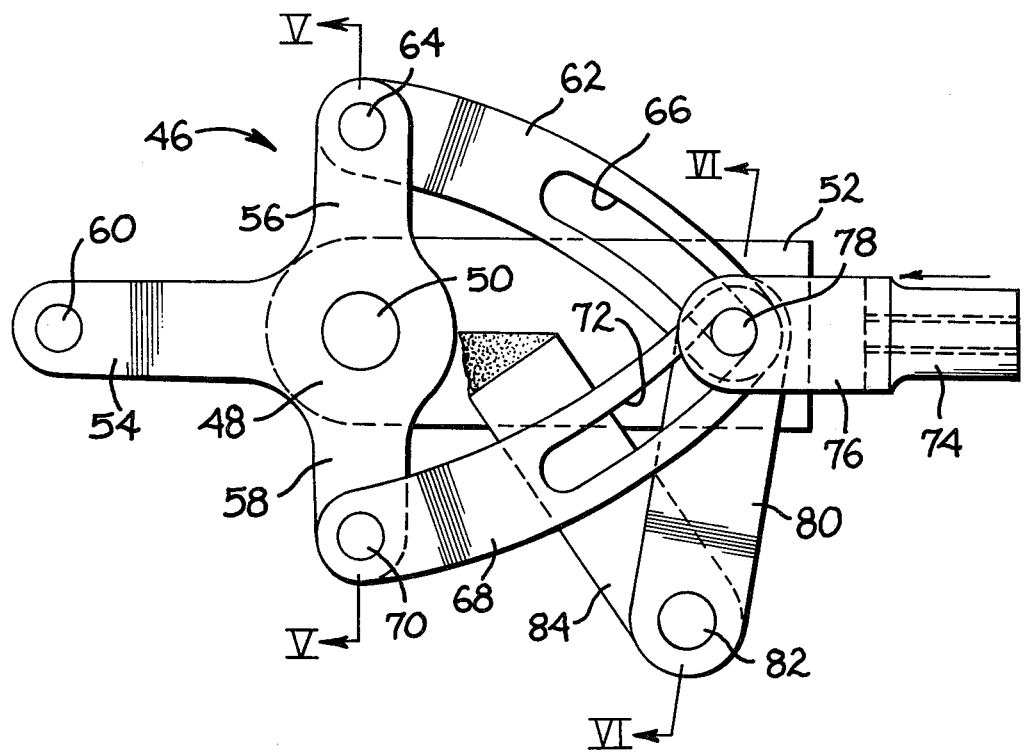
FIG. 2 is an enlarged side elevational view of a portion of the linkage assembly of FIG. 1 and showing a linkage in a neutral position.

Another link or control rod 74 is movable in the single direction shown by the arrow is FIG. 2 from a neutral position and has one forked end 76 through which a pin 78 extends, as more clearly shown in FIG. 4. Pin 78 also extends through the slots 66 and 72 and through one end of a link 80 whose other end is pivotally connected at 82 to an end of a link 84 which is welded to support 52 at its other end. Links 80 and 84 comprise a stabilizing element which stabilizes the linear movement of control rod 74. As shown in FIG. 1, rod 74 is in the neutral position and is movable forward or to the left by crank 46. A spring such as spring 21 of governor 20, returns rod 74 back to the neutral position.

A link 85 shown in FIG. 1 is also pivotally connected at one end to pivot 44 and at its other end by way of a pivot pin 86 to a link 87. Link 87 is fixed to a shaft 88 which is rotatably mounted to a part of the frame 10. A link 90 is suitably connected, such as by welds, to shaft 88 to rotate with shaft 88. A joint, shown generally at 92, is secured to link 90 and to the end of a rod 94 to convert rotary motion of link 90 to linear motion of the rod 94. Rod 94 extends into a cylinder 96 and is pivotally connected via a rod 98 and a lost motion mechanism 100 to the control link 24 for the swash plate 22b of the transmission 22. Lost motion mechanism 100 permits continued movement of the rod 94 after maximum displacement of the link 24 and hence swash plate 22b in either direction, as would be known in the art. For example, the lost motion mechanism 100 may include springs 102, 104 coupled through movable plate 106, which transmit the movement of rod 94 to lever 24 until maximum displacement and then are compressed or expanded, depending on the direction of movement of rod 94, thereby enabling continued movement of the rod 94 without further displacement of the link 24.

Figure 3:
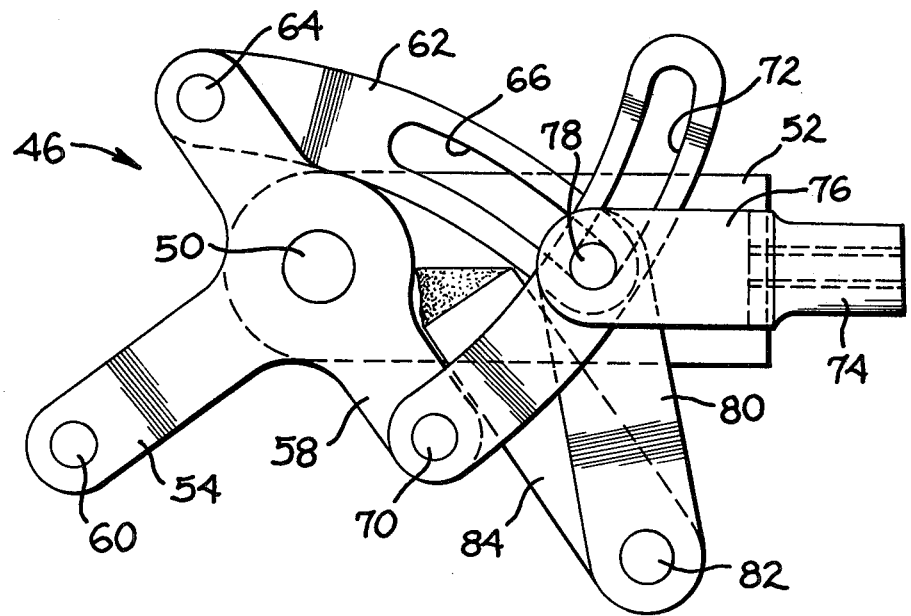
FIG. 3 is a view of the linkage of FIG. 2 after this linkage has been shifted from the neutral position.

The operation of the invention will now be described. Movement of the rocker pedal 26 from the neutral position shown in either a clockwise or counterclockwise direction will produce linear movement of the rod 74 in a single direction from its neutral position. At the same time, such movement of pedal 26 from the neutral positon in the clockwise or counterclockwise direction will cause movement of the link 24 and, hence, the swash plate in the clockwise or counterclockwise direction. For example, if rocker pedal 26 is rotated in the counterclockwise direction from the neutral position, which direction may correspond to forward drive of the vehicle, pin 44 will rise, as viewed in FIG. 1, causing pin 60 to descend and thereby rotating crank 46 in a counterclockwise direction. This movement of crank 46 is particularly shown in FIG. 3. As a result, link 62 will cause pin 78 to move towards the left and slide within slot 72 of link 68. Also, link 80 will pivot about pin 82 to stabilize this leftward movement of the rod 74. This movement of rod 74 will actuate the governor 20 to move throttle valve 16 to permit more fuel to flow through the carburetor and thereby increase the speed of the engine as the rod 74 is pulled leftward.

If the rocker pedal 26 is rotated in a clockwise direction, which may correspond to reverse drive of the vehicle, pin 44 will descend and pin 60 will be raised to rotate crank 46 in a clockwise direction. This time, link 68 will move pin 78 leftward and link 62 will slide relative to pin 78 via slot 66. Thus, again rod 74 will move leftward and thereby activate governor 20 to move throttle valve 16 to admit more fuel to the engine to increase engine speed as the pedal 26 is depressed, and again the link 80 will pivot about pin 82 to stabilize the movement of rod 74.

When the pedal 26 is rotated in the counterclockwise direction, the swash plate 22b is moved to place the vehicle in forward drive. On this counterclockwise movement of pedal 26, pivot 86 will be raised, as viewed in FIG. 1, thereby rotating shaft 88 and consequently, link 90 in one direction. This causes rod 94 to move linearly in one direction, for example, to the right as viewed in FIG. 1, thereby moving link 24 and the swash plate in a counterclockwise direction to bring the transmission into forward drive. When the pedal 26 is rotated in the clockwise direction from the neutral position, pin 86 will be lowered, thereby rotating shaft 88 and link 90 in an opposite direction to move rod 94 leftwards. Accordingly, link 24 and the swash plate 22b will be moved in a clockwise direction to bring the transmission into reverse drive.

As will be appreciated from the above, the linkage assembly 12 operates in a manner to control simultaneously engine speed, and vehicle speed and direction. As the pedal 26 is moved in the counterclockwise direction from its neutral position, the swash plate 22b will be immediately moved to bring the transmission into forward drive. Continued movement of the pedal 26 increases the displacement of the pump 22a so that the vehicle speed increases up to a maximum determined by the maximum displacement of the pump. Also, as the pedal 26 is being rotated in this counterclockwise direction, the throttle valve 16 is being continuously opened to increase the engine speed. When the pump has reached maximum displacement, the resilient lost motion mechanism 100 permits continued counterclockwise movement of the pedal 26 so that while the vehicle is travelling at maximum speed, the engine speed can be increased.

When the pedal 26 is rotated from the neutral position in a clockwise direction, the swash plate 22b will be immediately moved to place the transmission in reverse drive. Continued movement of the pedal 26 increases the displacement of the pump 22a to increase the speed of the vehicle in reverse drive. This movement also causes the throttle valve 16 to open further, thereby increasing engine speed. When the pump 22a has reached maximum displacement in the reverse drive mode, the resilient lost motion mechanism 100 permits continued clockwise motion of the pedal 26 to increase further the engine speed.

While the invention has been particularly shown and descirbed with reference to a preferred embodiment thereof, it will be understood by those skilled in the art that the foregoing and other changes in form and details may be made therein without departing from the spirit and scope of the invention.

The embodiments of the invention in which an exclusive privilege or property is claimed are defined as follows:

1. A system for converting movement of one member in a first or a second direction to movement of a second member in a single direction when the one member is moved in either the first or the second direction, comprising:
   (a) a support;
   (b) a crank having one end and an opposite end, said crank being pivotally connected to said support;
   (c) a first arcutate link having an arcuate slot and connected to said one end of said crank;
   (d) a second arcuate link having an arcuate slot and connected to said opposite end of said crank;
   (e) a third link, said third link being movable in a single direction to move the second member;
   (f) means for connecting siad first link, said second link and said third link in common, said connecting means being slidable in said arcuate slot of said first link and said second link; and
   (g) means for rotating said crank in one direction in response to movement of the one member in the first direction and for rotating said crank in the opposite direction in response to movement of the one member in the second direction.

2. A system according to claim 1, wherein said crank includes:
   (a) a hub;
   (b) a first arm extending radially in one direction from said hub and having an outer end connected to said first link;
   (c) a second arm extending radially from said hub in an opposite direction from said first arm and having an outer end connected to said second link; and
   (d) a third arm extending radially from said hub in an direction and having a third outer end connected to said rotating means.

3. A system according to claim 2 wherein said slidable means includes a pin extending through said slot of said first link and said second link and through said third link.

4. A system according to claim 3, wherein said first link is pivotally connected to said outer end of said first arm and said outer link is pivotally connected to said second end of said second arm.

5. A system according to claim 4, wherein said means for rotating includes a cable having one end pivotally connected to said outer end of said third arm and another end connectable to the one member.

6. A system according to claim 1, further including means for stabilizing the movement of said third link.

7. A system according to claim 6, wherein said stabilizing means includes:
   (a) a fourth link having one end fixed to said support and another end; and
   (b) a fifth link having one end pivotally connected to said other end of said fourth link and another end connected to said slidable means.

8. A system according to claim 7, wherein said one end of said fourth link is welded to said support.

9. A system according to claim 3, further including means for stabilizing the movement of said third link.

10. A system according to claim 9, wherein said stabilizing means includes:
    (a) a fourth link having one end fixed to said support and another end; and
    (b) a fifth link having one end pivotally connected to said other end of said fourth link and another end connected to said pin.

11. A system according to claim 9 wherein said one end of said fourth link is welded to said support.

12. An assembly for controlling a first mechanism and a second mechanism of a vehicle, the first mechanism regulating the speed of the vehicle engine and the second mechanism determining the direction of movement and speed of the vehicle, said assembly comprising:
    (a) a first fixed support;
    (b) a member pivotally mounted on said first support, said member being rotatable about said first support from a neutral position in a first direction or a second direction;
    (c) first means for causing the first mechanism to change the speed of the vehicle engine, said means for causing being responsive to the rotational movement of said member, including:
       (i) a second support;
       (ii) a crank having one end and an opposite end, said crank being pivotally connected to said second support;
       (iii) a first arcuate link having an arcuate slot and connected to said one end of said crank;
       (iv) a second arcuate link having an arcuate slot and connected to said opposite end of said crank;
       (v) a control rod, said rod being movable in one direction in response to said member being movable from said neutral position in said first direction or said second direction;
       (vi) means for connecting in common said first link, said second link and said control rod, said connecting means being slidable in said slot of said first link and said second link;
    and
       (vii) means for rotating said crank in one direction in response to movement of said member from said neutral position in said first direction and for rotating said crank in the other direction in response to movement of said member from said neutral position in said second direction; and (d) second means for causing the second mechanism to enable the vehicle to move in one direction in response to said member being rotated from said neutral position in said first direction or to enable the vehicle to move in another direction in response to said member being rotated from said neutral position in said second direction, said second means for causing being connected to said member.

13. An assembly according to claim 11, further including means for stabilizing the movement of said control rod, said stabilizing means being connected to said second support.

14. An assembly according to claim 12, wherein said crank include:
(a) a hub;
(b) a first arm extending radially in one direction from said hub and having an outer end connected to said first link;
(c) a second arm extending radially from said hub in an opposite direction from said first arm and having an outer end connected to said second link; and
(d) a third arm extending radially from said hub in an direction and having a third outer end connected to said rotating means.

15. An assembly according to claim 13, wherein said second means for causing includes:
(a) a third link;
(b) a shaft connected to said third link, said shaft being constructed for regulating the second mechanism and being rotatable between two extreme positions; and
(c) means for rotating said third link in one direction in response to said member being moved from said neutral position in said first direction and for rotating said third link in the other direction in response to said member being moved from said neutral position in said second direction, said third link rotating means being connected to said member.

16. An assembly according to claim 15, wherein said third link rotating means includes lost motion linkage means for enabling said member and said crank to continue to rotate after said shaft is in an extreme position.

17. An assembly according to claim 16, wherein said member is a pedal.

18. An assembly according to claim 17, wherein said third link rotating means and said crank rotating means include in common a bracket depending from one end of said pedal, said third link rotating means and said crank rotating means being pivotally connected in common to said bracket.

19. Apparatus for controlling the speed and direction of movement of a vehicle, and the speed of the vehicle engine comprising:
(a) a carburetor having a throttle valve;
(b) a governor connected to said throttle valve, said governor being constructed to control the speed of the vehicle engine;

(c) hydrostatic transmission means for changing the direction of movement and speed of the vehicle, said transmission means having a reversible displacement pump;
(d) a vehicle frame having a first bracket;
(e) a pedal pivotally mounted on said first bracket, said pedal being rotatable about said first bracket from a neutral position in a first direction and a second direction;
(f) means for controlling said governor including:
(i) a crank having one end and an opposite end, said crank being pivotally connected to said transmission means;
(ii) a first arcuate link having an arcuate slot and connected to said one end of said crank;
(iii) a second arcuate link having an arcuate slot and connected to said opposite end of said crank;
(iv) a control rod connected to said governor, said rod being movable in one direction in response to movement of said pedal from said neutral position in said first direction or said second direction;
(v) a pin connecting in common said first link, said second link and said control rod, said pin being slidable in said slot of said first link and said second link and being at one end of said slot of said first link and said second link in response to said pedal being in said neutral position; and
(vi) means for rotating said crank in one direction in response to movement of said pedal from said neutral position in said first direction and for rotating said crank in the other direction in response to movement of said pedal from said neutral position in said second direction, said crank rotating means being connected to said pedal; and
(g) second means for placing said pump in one state, corresponding to a forward direction of vehicle movement, in response to movement of said pedal from said neutral position in said first direction, and for placing said pump in another state, corresponding to a reverse direction of vehicle movement, in response to movement of said pedal from said neutral position in said second direction, said second means for placing being connected to said pedal.

20. Apparatus according to claim 18 wherein said placing means includes lost motion means for enabling said pedal and said crank to continue to be rotated after the state of said pump has been changed.

21. Apparatus according to claim 19, wherein said means for controlling further includes means for stabilizing the movement of said control rod.

22. Apparatus according to claim 21, wherein said stabilizing means includes:
(a) a third link having one end fixed to said transmission means and another end; and
(b) a fourth link having one end pivotally connected to said other end of said third link and having another end pivotally connected to said pin.

* * * * *